3,342,756
PROCESS FOR REGENERATING STRONGLY ACID CATION EXCHANGERS WITH SULPHURIC ACID
Friedrich Martinola, Cologne-Flittard, and Günter Siegers, Cologne-Hoehenberg, Germany, assignors to Farbenfabriken Bayer Aktiengesellschaft, Leverkusen, Germany, a German corporation
No Drawing. Filed May 19, 1964, Ser. No. 368,727
Claims priority, application Germany, June 14, 1963, F 39,988
1 Claim. (Cl. 260—2.2)

The use of sulphuric acid for regenerating strongly acid cation exchangers in desalting plants requires the use of special processes to avoid the precipitation of calcium sulphate in the exchanger bed. It is also generally known that a lower capacity results when using sulphuric acid for regeneration than when using an equivalent quantity of hydrochloric acid.

To avoid the formation of calcium sulphate when regenerating the cation exchanger various methods have already been used: A preliminary regeneration with sodium chloride has been carried out, the regeneration has been carried out with a mixture of nitric and sulphuric acid as regenerating agent or regenerating with sulphuric acid, the concentration of which is increased continuously or stepwise in the process.

The object of the present invention is a process for the regeneration of strongly acid cation exchangers, which process can be carried out using high concentrations of sulphuric acid without auxiliary measures, by the use of sulphuric acid which has been passed over an anion exchanger containing chloride and nitrate ions before it comes into contact with the cation exchanger.

The anion exchangers used may be weak, medium or strong basic ion exchangers. The anion exchanger should contain at least 30% of its total ion charge in the form of chloride and/or nitrate ions whereas the hydroxyl, carbonate and silicic acid ions should amount to less than 20% of the total ion charge. The total ion charge of the anion exchanger must be adjusted to the ion charge of the cation exchanger filter that is to be regenerated by the process described.

Such an anion exchanger is always present in a desalting cycle and therefore the process does not require additional equipment. After exhaustion of its exchange capacity, the anion exchanger is in most cases in the desired form. In the rare case where the water which is being desalted only contains sulphate ions, the anion exchanger can be connected to the chloride form with a small quantity of sodium chloride before the addition of sulphuric acid.

The process has the following advantages compared with the known process:

(1) Regeneration is carried out with sulphuric acid of only a single concentration which can be sufficiently high that an optimum regeneration effect is achieved.

(2) Separation of calcium sulphate in the filter bed of the cation exchanger is avoided.

(3) Compared with the known regeneration technique using various sulphuric acid concentrations, a higher capacity of cation exchanger is achieved.

(4) Compared with the known technique involving preliminary regeneration with sodium chloride or regeneration with several acid concentrations, there is a smaller cation slip in the subsequent charging of the exchanger.

(5) By treating the anion exchanger with sulphuric acid it is freed from organic compounds taken up by it and is thus purified.

(6) The conversion of the anion exchanger into the sulphate form before regeneration with sodium hydroxide liquor increases its exchange capacity.

(7) In certain types of anion exchangers, the pretreatment with acid considerably reduces the amount of washing water required after regeneration with sodium hydroxide liquor.

Examples of cation exchangers that may be used in the process are sulphonated polystyrene resins cross-linked with divinyl benzene or condensation products of aryl sulphonic acids with formaldehyde, and examples of anion exchangers are polystyrene derivatives containing amino or ammonium groups and cross-linked with divinylbenzene or condensation products such as resins of epichlorohydrin with aliphatic amines.

Example 1

A cation exchanger based on polystyrene with sulphonic acid groups was regenerated. The exchangers had been previously charged with an aqueous solution of calcium-, magnesium- and sodium salts in the equivalent proportions 45% Ca:15% Mg:40% Na. The regeneration of one volume of this exchanger was carried out with 1.25 volumes of 8% sulphuric acid. The sulphuric acid solution was first conducted over one volume of a synthetic resin anion exchanger. This anion exchanger contained chloride, sulphate and OH or $HCO_3$ ions in equivalent proportions of 54% Cl:31.5% $SO_4$:14.5% OH+$HCO_3$. The total capacity of cation and anion exchanger was in the ratio of 1:1.

After regeneration, the cation exchanger was charged with water of the composition given above and a concentration of 6 milliequivalents per litre of dissolved salts. The result of the experiment together with the results that can be achieved with known regeneration processes are summarised in the table below.

|  | Regeneration over anion exchanger | Regeneration with increasing concentrations | Regeneration with sodium chloride |
|---|---|---|---|
| Volumes of water per volume of cation exchanger | 143 | 119 | 190 |
| Cation leakage, percent | 1.5 | 3.1 | 15 |

Compared with the regeneration process with increasing sulphuric acid concentrations, a 20% higher yield at half the cation leakage was obtained. Although the water efficiency is lower than when using the preregeneration with sodium chloride, the cation leakage is only 1/10 of that measured in that process. The high value of the leakage by preregeneration with sodium chloride causes considerable expenditure in a desalting circuit.

We claim:

A process for regenerating resinous strongly acid cation exchangers with sulphuric acid which comprises initially passing a regenerating solution containing sulphuric acid over a resinous anion exchanger and passing the regenerating solution over the acid cation exchangers, the regenerating solution containing at least 25 g. of sulphuric acid per liter of solution and the anion exchanger containing at least 30% of its total ion charge in the form of chloride and nitrate ions.

References Cited

UNITED STATES PATENTS 2,683,695  7/1954  Dwyer et al. _____ 260—2.2
2,692,244  10/1954  Kunin et al. _____ 260—2.2

WILLIAM H. SHORT, Primary Examiner.

C. A. WENDEL, M. GOLDSTEIN, Assistant Examiners.